United States Patent
Tang

(10) Patent No.: US 6,217,816 B1
(45) Date of Patent: Apr. 17, 2001

(54) METHOD FOR RAPID FORMING OF A CERAMIC WORK PIECE

(75) Inventor: Hwahsing Tang, Yung-Ho (TW)

(73) Assignee: National Science Council (TW)

( * ) Notice: Subject to any disclaimer, the term of this patent is extended or adjusted under 35 U.S.C. 154(b) by 0 days.

(21) Appl. No.: 09/482,308

(22) Filed: Jan. 13, 2000

(30) Foreign Application Priority Data

Dec. 24, 1999 (TW) .................................................. 88122907

(51) Int. Cl.⁷ .................................................. B29C 35/08
(52) U.S. Cl. .......................... 264/497; 264/426; 264/434
(58) Field of Search .................................. 264/497, 426, 264/434

(56) References Cited

U.S. PATENT DOCUMENTS

| | | | |
|---|---|---|---|
| 5,870,663 | * | 2/1999 | Stucker et al. ........................... 419/12 |
| 6,007,764 | * | 12/1999 | Benda et al. .............................. 419/7 |
| 6,027,326 | * | 2/2000 | Cesarano, III et al. ............. 425/375 |

\* cited by examiner

Primary Examiner—Christopher A. Fiorilla
(74) Attorney, Agent, or Firm—Fish & Richardson P.C.

(57) ABSTRACT

An inorganic binder and a dissolving agent are put into ceramic powder. They are mixed to form a plastic green mixture. Then the said mixture is formed into a thin green layer. Preferably, this thin green layer will be preheated and dried such that the thin green layer will be hardened due to the bonding effect of the inorganic binder. A portion of the thin green layer exposed under a directed high-energy beam is sintered, preferably by a laser beam, to cause ceramic molecules to bond together locally due to heat fusion. By controlling the scanning path of the high-energy beam, a two-dimensional thin cross section of the ceramic part in arbitrary form can be produced. A second thin ceramic layer can be built onto the first thin ceramic layer and bonded to it by the same method. After multiple repetitions of this procedure a three dimensional ceramic part can be fabricated layer upon layer. The green portion, which is not scanned by the high-energy beam, will be removed with suitable method. A ceramic part can be rapidly produced in this way.

17 Claims, 9 Drawing Sheets

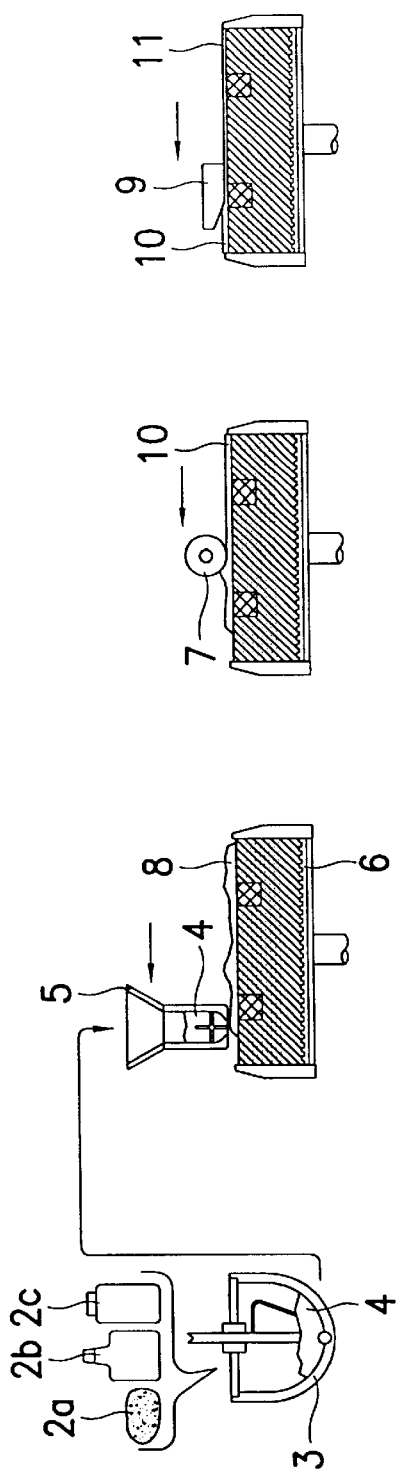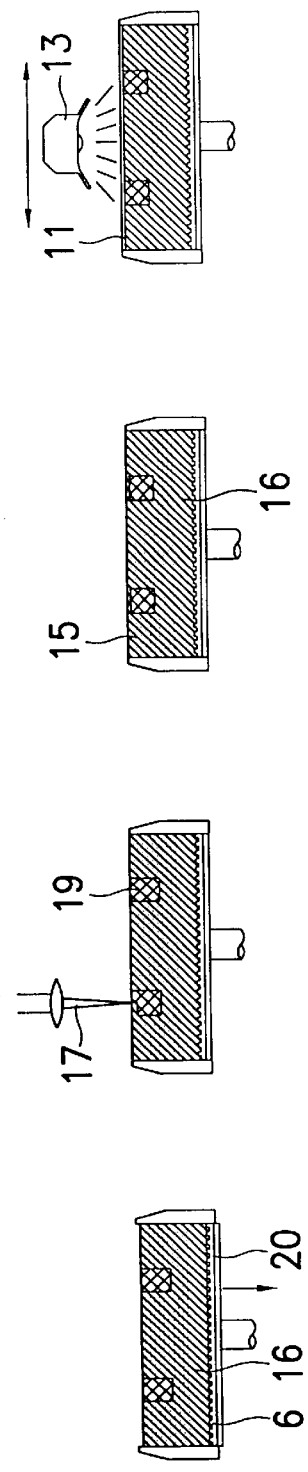

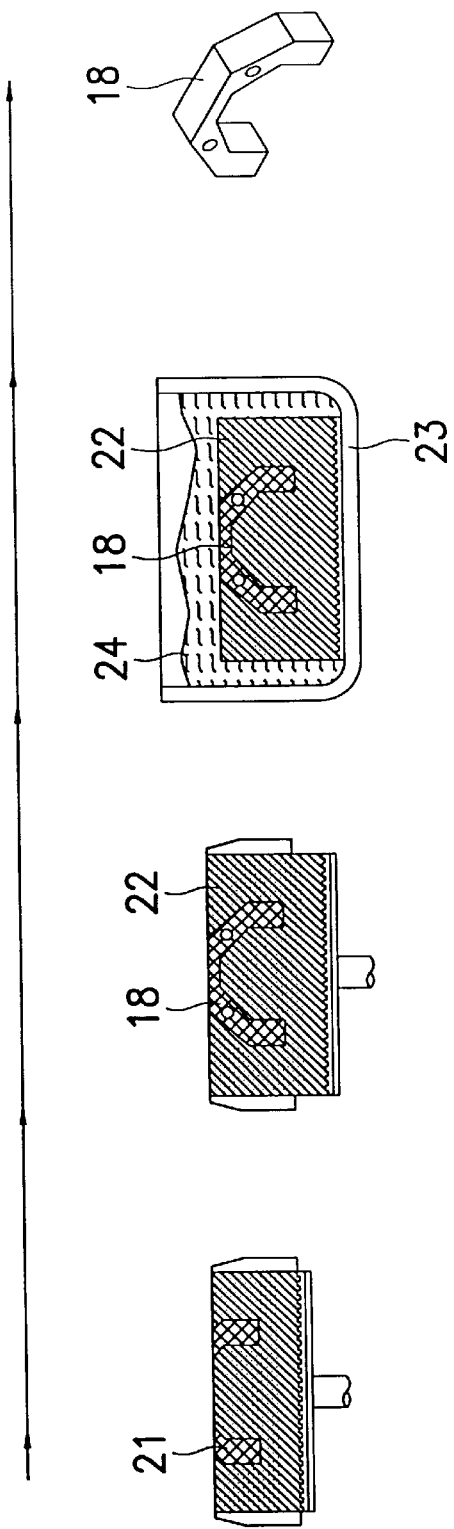

METHOD FOR RAPID FORMING OF A CERAMIC WORK PIECE

BACKGROUND OF THE INVENTION

1. Field of the Invention

The present invention relates to apparatus and method for direct and rapid forming of a ceramic work piece; more specifically, the present invention provides an apparatus and a method for directly, rapidly, and precisely fabricating a three-dimensional (3-D) ceramic work piece by a high energy beam, skipping the conventional process of sintering a ceramic workpiece in a furnace.

2. Description of Related Art

In the past decades, rapid prototyping combining the latest computer, manufacturing, and material science technology has provided a number of fabricating methods for producing three-dimensional, or 3-D, workpieces directly and rapidly. These fabricating methods vary in that some employ light energy to induce chemical bonding among involved materials, some employ heat fusion, and some employ adhesive to glue fragments of the workpiece together, etc. In terms of material used, metals, ceramics, polymers, and others are all possible candidates. Since different fabricating methods use different forms of energy to produce the desired workpieces, said rapid prototyping technology can be sorted into five different categories based on materials, bonding mechanism, and forms of energy involved during the fabricating process:

1. Stereo Lithography (SL) —U.S. Pat. No. 4,575,330 to Charles Hull, 1986. Dr. Brady of University of Michigan describes a process based on the Stereo Lithography method that uses ceramic resin (a mixture of ceramic powder and light-sensitive resin) as a raw material and exposes such material under a directed ultra violet light in order to solidify said liquid state resin. This process bonds ceramic powder, forms clay-like ceramic green parts, then removes the binder while increasing the density of the ceramic green parts at the same time with prior ceramic sintering technology.

2. Selective Laser Sintering (SLS) —U.S. Pat. No. 4,863,538, September, 1989 to Mr. Deckard of University of Texas at Austin represents this technology, which was invented in 1986, and has been subsequently commercialized by DTM company. The SLS technology can be applied to various materials to produce 3-D RP workpieces as long as the material is in the form of powder. At present, the SLS technology comprises the steps of covering ceramic powder with resin, melting the resin with a laser so that the resin acts as a bonding agent to the ceramic powder for forming a ceramic green part and then processing the ceramic green part with conventional ceramic sintering technology to obtain the final ceramic workpiece. A typical material used in the SLS process is aluminum oxide and some polymer compounds.

3. Fused Deposition Modeling (FDM)—Such technology involves heating a raw material until it melts, then material strands are extruded, which will be further shaped by FDM to form a 3-D object. Professor Agarwala, of Center for Ceramic Research at Rutgers University, has been implementing such FDM technology with ceramic powder and organic binder mixture in making material strands, the ceramic green part formed is then sintered by conventional ceramic sintering methods to obtain the final ceramic workpiece.

4. Three Dimensional Printing (3DP)—The 3DP technology is represented by the Three Dimensional Printing method (U.S. Pat. No. 5,204,055, April 1993, Sachs et al.) of Massachusetts Institute of Technology, which entails technologies similar to the ink jet technology in that binding agent is selectively spurted out and onto a designated powder material. Such process starts by laying a thin layer of powder, spurting liquid binder from the nozzle and onto the surface of the powder layer, wherein the powder layer in the affected area will glue together to form a thin cross section. The above steps are repeated until a three-dimensional object is formed. If the subject raw material is ceramics, then the above steps will form a solid three-dimensional ceramic green part, and conventional ceramic sintering technology will complete said 3DP process in forming a final, sintered ceramic workpiece.

5. Laminated Object Manufacturing (LOM)—U.S. Pat. No. 4,752,353, Feygin, owned by a U.S. company named Hydronetics, describes a technology that utilizes a laser beam to carve out a cross section of a 3-D object on a thin slice of material in its solid state, then glue these thin slices one on top of another in later stages to form a 3-D object. After thin slices of a certain material are formed, adhesive is applied between thin slices with each stacked on top of another. A final 3-D object is then formed as soon as all the slices are bonded together with adhesive. Such a process can be applied on materials including paper and sheet metal. However, in the case of ceramics as the prime composition material, each ceramic thin slice is pre-fabricated with ceramic powder and polymer binder, then the aforementioned LOM process is applied. Each ceramic thin slice is shaped by a directed laser beam into a corresponding cross section layer of a 3-D workpiece. Then when all the thin slices corresponding to the cross sections are shaped, a 3-D ceramic green part can be formed by stacking and gluing all the slices one on top of another. A final ceramic workpiece can be obtained this way after the green part is sintered in a furnace.

The above-mentioned technologies, sorted in five categories, are all related to the forming of ceramic green parts and all require further sintering equipment for final ceramic sintering. Since ceramic green parts fabricated by the conventional rapid prototyping machine need to be further calcined, or sintered, in a furnace to obtain the final ceramic workpiece, these processes are then referred to as indirect ceramic making process. While the above-mentioned indirect process of ceramic making can make workpieces of complex configurations and can save the usage of molds and dies, there are drawbacks such as: requiring further sintering steps, which demands both additional equipment and technical know-how; requiring further removal of the binding agents during the conventional sintering, which prolonges the processing time since the entire ceramic making process can not be completed in consecutive steps. Therefore, it has long been an object of the rapid prototyping machine manufacturers to devise a way of forming ceramic workpieces directly and rapidly by a rapid prototyping machine, skipping the conventional ceramic-sintering phase in a furnace.

SUMMARY OF THE INVENTION

Accordingly, it is an object of the present invention to improve on prior technical inadequacies in indirect ceramic making by providing a direct method in which assorted ceramic prototypes, or workpieces, in relatively small quantities can be produced quickly and directly without actually applying conventional ceramic sintering technology.

The present invention, therefore, is about a method and an apparatus for producing three-dimensional ceramic parts.

Specifically, an inorganic binder and a dissolving agent are mixed with ceramic powder to form a plastic green mixture, and then this plastic green mixture is further formed into a thin green layer by mechanical means. Preferably, this thin green layer will be preheated, dried, and then hardened due to the adhesive bonding effect of the inorganic binder. According to an embodiment of the present invention, the thin green layer is sintered along the directed scanning path by exposure under a focused high-energy beam, preferably a laser beam, causing ceramic molecules to bond together locally due to heat fusion. By controlling the scanning path of the high-energy beam, a two-dimensional thin cross section of the ceramic part in arbitrary form can be produced. A second thin ceramic layer can be built onto the first thin ceramic layer and bonded to it by the same method. After multiple repetitions of this procedure a three dimensional ceramic part can be fabricated layer upon layer. The green portion, which is not scanned by the high-energy beam, is removed. A ceramic part can be rapidly produced in this way.

Accordingly, the present invention is characterized by bonding the ceramic powder by an inorganic binder first. This bonding by an adhesive inorganic binder can effectively prevent a dislocation, or balling, of ceramic powder during sintering by a high energy beam. So a satisfied result can be obtained by the present invention.

BRIEF DESCRIPTION OF THE DRAWINGS

Other objects, features, and advantages of the present invention will become apparent from the following detailed description of the preferred but non-limiting embodiment. The description is made with reference to the accompanying drawings in which:

FIG. 1A to FIG. 1L show a series of steps required to fabricate a ceramic workpiece according to a process embodiment of the present invention;

DETAILED DESCRIPTION OF THE PREFERRED EMBODIMENT

Figure 2A:
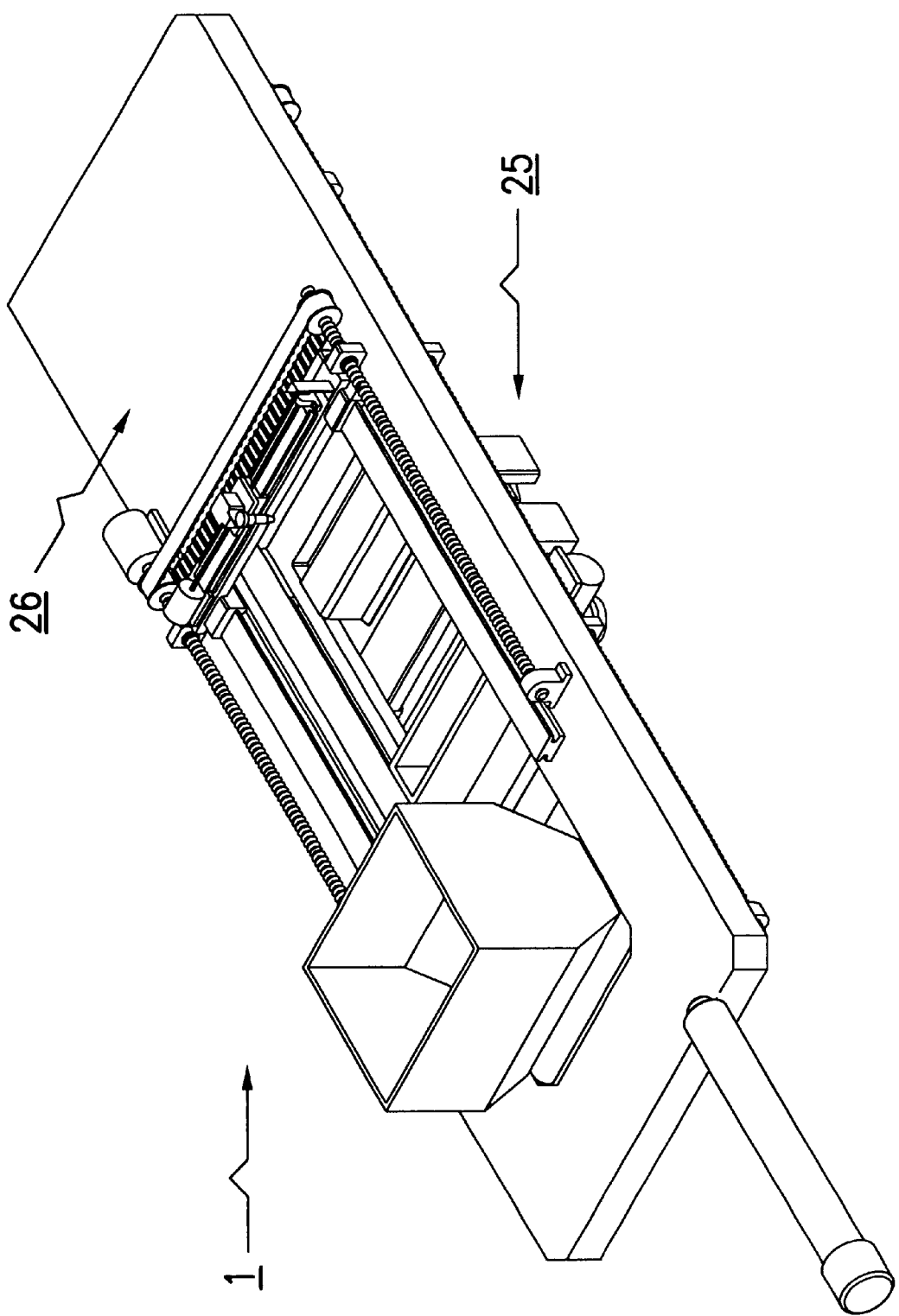
FIG. 2A is a perspective drawing of a rapid prototyping machine for ceramics according to an apparatus embodiment of the present invention.

The process according to the present invention begins by mixing an inorganic binder and a dissolving agent with ceramic powder to form a plastic green mixture, and with a suitable method the plastic green mixture is formed into a thin green layer. The thin green layer is preferably dried and hardened by preheating before the next steps. Then by applying a high-power energy beam, preferably a laser, to the ceramic green part repeatedly, a 3-D ceramic workpiece is formed layer by layer. Thus a ceramic workpiece of complex three-dimensional configuration can be formed after the green portion is removed from the sintered portion.

The present invention is characterized in that it employs two different bonding mechanisms, namely bonding by a binding agent and bonding by heat fusion, to bond the subject ceramic in two steps during the fabrication process. Specifically, an inorganic binder bonds and forms a thin green layer of ceramic material with sufficient strength, then laser energy is used to scan the hardened thin green layer and consequently sinter a pre-determined two-dimensional thin cross section of a ceramic part. Since the bonding mechanisms are different between the green portion and the ceramic portion, the green portion can be removed by soaking in water or by water jet to wash off the untouched green portion from the ceramic portion. Since the ceramic portion can withstand chemical erosion much more than the green portion, sodium hydroxide or potassium hydroxide can be used, instead of water, to quickly weaken the bond in the green portion and to separate the ceramic work piece from the green portion.

In comparison, the most significant improvement that the present invention has made over its predecessors is that the present invention can produce a completely sintered 3-D workpiece from start to finish all in one machine, while the conventional rapid prototyping machines are only capable of forming a 3-D ceramic green part and requires an additional sintering process in a furnace. Thus, the present invention has the overall advantages of cutting down on production time and cost.

The following is a reference table summarizing the major differences between the present invention and the prior rapid prototyping technologies including SL, SLS, FDM, 3DP, and LOM:

TABLE 1

DIFFERENCES BETWEEN THE PRESENT INVENTION AND SL, SLS, FDM, 3DP, AND LOM

| Technology | Fabrication of Ceramic Green Part | Sintering |
| --- | --- | --- |
| The Present Invention | bonds the ceramic powder with an inorganic binder to form a shaped thin green layer one on top of another | W/ high power energy beam |
| SL | using ceramic resin for the fabricating material and exposing such material under ultra violet light in order to solidify said liquid state resin | in sintering furnace |
| SLS | covering ceramic powder with resin, melting the resin with a laser so that the resin acts as a bonding agent to the ceramic powder for forming a ceramic green part | in sintering furnace |
| FDM | ceramic powder and organic binder are mixed together to make strands that will be further shaped by FDM to form a 3-D ceramic green part | in sintering furnace |
| 3DP | binding agent is selectively spurted onto a powder material such that the effected area will be glued together to form a thin cross section one on top of another | in sintering furnace |

TABLE 1-continued

DIFFERENCES BETWEEN THE
PRESENT INVENTION AND SL, SLS, FDM, 3DP, AND LOM

| Technology | Fabrication of Ceramic Green Part | Sintering |
| --- | --- | --- |
| LOM | thin slices of certain material corresponding to specified cross sections of a 3-D object are pre-shaped by a laser beam, then adhesive is applied between thin slices with one on top of another | in sintering furnace |

Typically, high melting point industrial ceramics require special high-temperature sintering furnace. However, the present invention requires only medium-power laser energy for sintering, wherein a $CO_2$ laser source having power output of more than 3 watts is sufficient enough for producing an aluminum oxide workpiece with a high melting point. Thus, manufacturing a 3-D ceramic work piece according to the method and apparatus of the present invention can cut down both equipment and energy costs. Moreover, the apparatus according to the present invention can be programmed to produce a number of identical 3-D ceramic workpieces or to produce an assortment of different 3-D ceramic workpieces at a time. Since the cost of typical ceramic materials such as aluminum and silicon oxides are rather inexpensive largely due to their abundance on earth, the aluminum and silicon oxides are generally considered cheap, sanitary, and recycle materials while having many advantages concerning such issues as operational safety and environmental protection.

Combining with the above-mentioned characteristics in function and performance, it becomes evident that the present invention is applicable in many areas and constitutes innovative steps with many improvements over the prior arts.

Furthermore, according to the book "Introduction to Ceramics" by Kingery, as the thickness of a ceramic workpiece or the rate of change in the ambient temperature increases, the ability of the ceramic workpiece to resist thermal shock decreases. A conventional powder metallurgical sintering process typically requires gradual temperature increase to prevent cracking in the final products. However, the amount of time required for each laser ceramic sintering cycle involving both heating and cooling can be as short as one second. Unless the overall thickness of the ceramic workpiece being sintered by a high energy beam is extremely thin, the ceramic workpiece will tend to crack due to internal stress caused by thermal shock. Thus, ceramic layers without cracking can most likely be fabricated by starting with laying very thin green layers on a specified surface then by subsequent sintering process with a directed laser beam scanning along a pre-determined path.

Experiments conducted by the inventor have shown that a mixture of inorganic binder, dissolving agent, and ceramic powder can be made into a thin green layer of plastic property such that ceramic particles are bonded to each other by the bonding action of the inorganic binder. Thin green layer made in this way has more material strength and tends to have less chance of ceramic powder clustering, or balling, after it is sintered by a laser beam. Consequently, very thin cross-sectional layer of sintered ceramic workpiece (typically under 0.2 mm) can be fabricated, and the workpiece formed by accumulations of the thin ceramic layers is free from any cracks. The method according to the present invention can be applied to obtain various ceramic workpieces of complex shape in reasonable time spans, so it is ideal for many rapid prototyping applications that involves small quantity manufacturing.

The followings are detailed descriptions relating to every technical aspect of the apparatus and method according to the present invention; wherein an apparatus embodiment, a process embodiment, and finally an experiment are each introduced to demonstrate the feasibility of rapidly forming a 3-D ceramic workpiece according to the present invention.

In general, the fabricating method according to the present invention involves the following steps: a. preparation of plastic green mixture, b. forming thin green layers, c. scanning the thin green layer with a high-power energy beam to form a sintered ceramic workpiece, and d. removing un-affected green portions from the finished ceramic workpiece.

a. Preparation of Plastic Green Mixture Referring to FIG. 1, ceramic powder 2a comprises of either a single ceramic ingredient such as carbides, nitrides, aluminum oxide, silicon oxide, zirconia oxide, and other oxides or a mixture of two or more above ceramic ingredients.

Inorganic binder 2b typically is comprised of either water glass, clay, or aluminum dyhydrogen phosphate (denoted as $Al(H_2(PO_4))_3$ hereinafter), and the main function of the inorganic binder is to bind particles of the ceramic powder 2a into forming a hard and strong green layer so that balling of the ceramic powder 2a, caused by a dislocation of ceramic powder during sintering, can be prevented. Inorganic binder 2b can be mixed with a dissolving agent 2c such as water, so the ceramic powder 2a and inorganic binder 2b can be evenly bound together with the aid of said dissolving agent 2c.

The above-mentioned three raw materials are evenly and thoroughly mixed together with an appropriate proportion inside a mixing device 3 while keeping the plastic green mixture wet in preparation for forming the thin green layers. According to an embodiment of the present invention, mixing silicon oxide (of 79 $\mu m$~53 $\mu m$ particle size) with 6% of water glass and 6% of water can get a plastic green mixture with fairly strong binding among the ceramic particles.

Among several choices for the above-mentioned inorganic binders, experiments have shown that the most effective one for serving the purpose of this embodiment is aluminum dyhydrogen phosphate (denoted as $Al(H_2(PO_4))_3$ hereinafter). In another embodiment of the present invention, aluminum oxide granules of 220 mesh size are mixed with 5% $Al(H_2(PO_4))3$ and 6% of water to make the plastic green mixture. After a ten-minute heating at a temperature of about 150° C., the plastic green mixture is dehydrated and hardened such that the aluminum oxide particles are closely bounded together by the gluing action of the inorganic binder 2b. If the hardened plastic green mixture is left unattended under a normal room temperature, it will tend to soften due to absorption of moisture in the air, which makes it evident that the process of dehydration and hardening by heating and the process of softening by re-hydration are both reversible processes. Because of this characteristic, the plastic green mixture composed of aluminum oxide and $(Al(H_2(PO_4))_3)$ is recyclable, and has been confirmed by relevant experiments by the inventor, the plastic green mixture composed of silicon oxide and $(Al(H_2(PO_4))_3)$ has the same characteristic of reversibility and is recyclable as well.

b. Forming Thin Green Layers

Forming the thin green layer means laying a thin layer of the prepared plastic green mixture 4 by a pre-determined thickness according to an embodiment of the present invention. In order to accomplish this objective, a fixed amount of the plastic green mixture 4 must be fed to a worktable 6 each time a thin green layer is to be formed. As shown in FIG. 2F, if the feeding passageway for the plastic green mixture is not clotted in any way, then the feeding device can transport a predetermined amount of the plastic green mixture 4 onto the worktable with the aids of a blade wheel 40 and gravitational force each time a thin green layer is to be laid. If, however, the feeding passageway is prone to clotting, then the plastic green mixture can be fed with the aid of a screw rod feeding device (not shown). Preferably, the outlet opening of said feeding devices should comprise a drawing die of rectangular shape with its width equal to that of the thin green layer 11 such that the plastic green mixture is outputted through the drawing die while moving along the x direction at the same time, thus forming a crude shape of the thin green layer to be formed. Alternatively, the drawing die may be of circular shape such that the plastic green mixture is outputted through the round-shaped drawing die while moving on a plane in the x and y direction to form a crude shape of the thin green layer.

After a crude shape of a thin green layer is formed on the worktable by one of the above-mentioned feeding devices, the loose plastic green mixture 8 must be further conditioned by pressing and flattening so that a thin green layer 11 can be formed and bonded evenly to the layer immediately below with a uniform density. Two feasible methods for forming a uniformly distributed thin layer according to the present invention are the roller-forming method and the squeegee-forming method. In the roller-forming method, a downward normal force is applied on a cylindrical roller 7 (see FIGS. 1C, 2E, and 2F) as it rolls over the roughly laid plastic green mixture. Specifically, a portion of the plastic green mixture being pressed by the roller 7 is squeezed and pushed towards another portion of the mixture which is less pressurized, so the roller 7 serves the purposes of compressing and thus reducing thickness of the thin green layer 11 at the same time. In another embodiment of the present invention, a squeegee method is adapted wherein a normal force is applied on a squeegee board 9 so as to push the squeegee board 9 (see FIGS. 1D, 2C, and 2D) horizontally across a top portion of the roughly laid plastic green mixture. Since the squeegee board and the top surface of the green mixture together forms a small angle x, as shown in FIG. 2F, the squeegee board 9 provides the effects of compressing, scraping, and leveling the thin green layer 11.

Due to the fact that wet green mixture tends to stick to the surface of any pressing tool that it has contact with, the water content of the plastic green mixture therefore should be carefully controlled. However, the water content of the plastic green mixture can not be too low as to obstruct the mixture from forming a thin green layer conveniently. Experiments have shown that mixtures having a water content of between 6% to 12% produce the most satisfactory results. On the other hand, experiments have also shown that the type of surface material used on the pressing tool closely correlates to the extent of the plastic green mixture sticking to the pressing tool. For example, using a pressing tool having Teflon as the surface material significantly decreases the tendency of the plastic green mixture sticking to the tool surface.

Repeated experiments have proved that the roller 7 has the effect of flattening the plastic green mixture; nevertheless, it is also been proved that using the roller 7 to form a thin layer of the green mixture is more difficult than using a squeegee board 9, whereas a squeegee board 9 is more capable of spreading out the plastic green layer into forming a thin layer.

The squeegee board 9 has to be pressed down while it scraps across a top portion of the thin green layer 11. Particularly, the squeegee board 9 is more effective in pressing and scraping dense plastic green mixture than pressing and scraping a loose mixture. Therefore, if the plastic green mixture supplied by the feeding device 67 is already dense, a squeegee board 9 alone can scrape and press the mixture into a thin layer. However, most likely the feeding device 67 can only supply a loosely formed plastic green mixture, so typically a roller 7 is used first to compress the mixture and then scraped by a squeegee board 9 to form a thin green layer for a more stable and uniform result.

Figure 3:
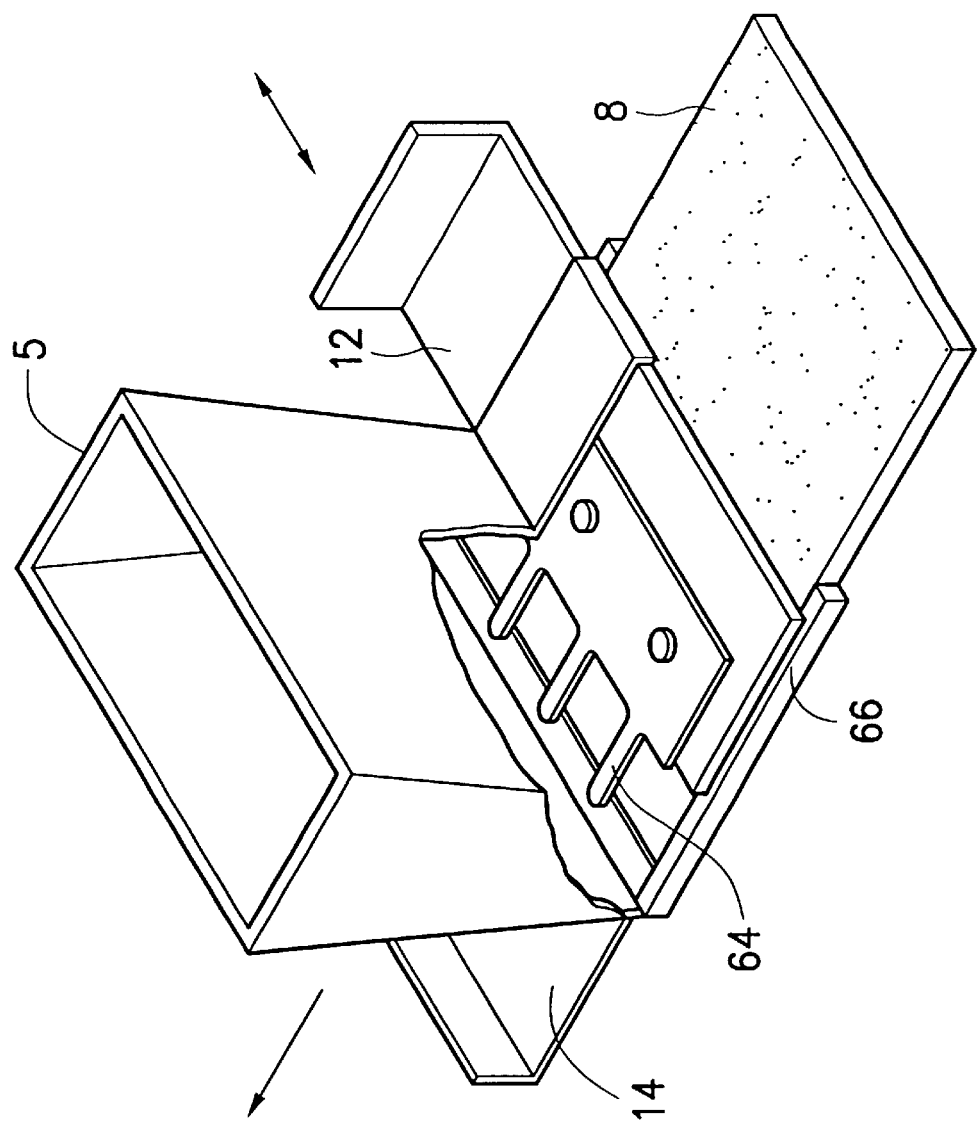
FIG. 3 is a perspective drawing of a stirring board type feeding device according to another embodiment of the present invention.

The above-mentioned thin layer is typically formed from an predetermined amount of loose plastic green mixture 8 fed by a feeding device 67 then press-formed by layer forming or pressing tools such as a roller 7 or a squeegee board 9 to roll or scrap the loose plastic green mixture 8 into a dense thin layer. Using a screw rod type feeding device requires a high output driving source, so if a more energy-efficient driving source is to be used to prevent the clotting of a feeding device, then a stirring board type feeding device as shown in FIG. 3 is preferred. Such feeding device includes a feeding container 5, a stirring board 12, a replaceable adjusting block 66, a plurality of flat stirrers 64, and a blocking device 14, whereas the feeding container 5 readies and supplies loose plastic green mixture 8, which moves with the feeding device in a single direction while laying a pre-determined amount of the mixture along the way. Meanwhile, a stirring board 12 positioned directly above an outlet of the feeding container 5 oscillates along a linear path which is perpendicular to the moving direction of the feeding device, whereas the outlet is located towards the bottom of the feeding device. Furthermore, a plurality of flat stirrers 64 is installed on a longitudinal edge of the stirring board 12 and extend outwardly so as to oscillate with the stirring board 12 in order to prevent the loose plastic green mixture 8 near the bottom of the feeding container 5 from being hollowed out. The plastic green mixture above the stirrers 64, after being stirred horizontally by the stirrers 64, falls to the bottom of the feeding container 5. Then the force of gravity, together with the stirring action of the stirrers 64, pushes the plastic green mixture out of the outlet opening as it is being pressed and polished by the horizontal oscillating motion of the stirring board 12 along the way to form a thin layer of dense plastic green mixture. The distance between the bottom surface of the stirring board 12 and the bottom of the feeding outlet can be adjusted by changing the adjusting block 66 in order to change the thickness of the outputted dense plastic green layer accordingly. When the feeding of the dense plastic green layer is near its completion, a blocking device 14 is inserted into the outlet of the feeding container 5 in a position directly under the stirring board 12 such that the plastic green mixture is blocked from exiting the outlet. The unidirectional movement of the stirring board 12 in the horizontal direction can be adjusted for varying the oscillation rate and moving speed of the feeding device 67 to make the plastic green layer expelled out of the feeding device 67 even denser. The elevating platform 20 is lowered a distance equals to the thickness of a dense, dehydrated thin green layer 15 for every consecutive thin green layer 11 to be formed to skip the use of a roller 7 or a squeegee board 9 for press-forming.

Furthermore, since wet thin green layer 11 contains excessive water molecules, the wet thin green layer 11 needs to be sufficiently dried and hardened before a laser beam or any other high-power energy beam is applied. For a rapid drying and hardening of a new thin green layer 11, heating by an external heating source is typically required. Preferably, the heating source is positioned directly above the workpiece, and the choice for the heating source ranges from an electric heating element, microwave, infrared, or $CO_2$ laser. Experiments have shown that heating by a radiant heating source directly above the wet thin green layer 11 is very effective; in particular, infrared with a wavelength of 6 $\mu$m or more has shown to be the most effective.

The area in which the plastic green mixture is to be applied is restricted by a frame 27. When a thin green layer 11 is to be formed, a pre-determined amount of the plastic green mixture is fed inside the boundaries of this frame 27, whereas the size of the frame 27 varies depending on the size and shape of the workpiece to be fabricated. Furthermore, as shown in FIG. 2E, each side of the frame 27 is made into a slope so that excess plastic green mixture can slide towards the outside of the working area.

When forming a thin green layer 11, the pressing tool (roller 7, squeegee board 9, etc.) has to travel a pre-determined distance relative to the workpiece to be formed, or the workpiece to be formed has to travel in relation to the pressing tool. Preferably, the pressing tool moves horizontally in the x direction while the workpiece to be formed moves vertically in the z direction. These relative movements can be accomplished by incorporating a timing belt, a screw rod, a chain, or even a steel cable in an actuating device.

Each tool or device is acting independently, so the operating speed of each tool can be optimized independently. Furthermore, different tools or devices can be collectively installed onto a supporting structure to simplify the driving mechanism by having all the tools or devices move in the same speed and direction.

As soon as a dried thin green layer is sintered into forming a thin ceramic layer, the workpiece to be formed is lowered a pre-determined distance and separated from the frame 27 in order to empty out a space to accommodate another thin layer of the loose plastic green mixture 8.

c. Scanning the Thin Green Layer with a High-power Energy Beam to Form a Sintered Ceramic Workpiece As the dehydrated thin green layer 15 is scanned by a high-power energy beam, preferably a laser, the composition material within the thin green layer immediately reacts by raising its surface and internal temperature abruptly, reaching a certain depth of the material for sintering to take place and thus causes bonding to occur among scanned areas. Therefore, by controlling or modulating each relevant parameter of the sintering process, the sintering depth can be controlled accordingly, whereas a series of points form a line, a series of overlapping lines form a plane, and a series of overlapping planes form a 3-D workpiece. Experiments have shown that ceramic layers with a thickness of less than 0.2 mm can be properly formed with both the sintered ceramic portion and the hardened, unsintered green portion connected to each other on the same layer and with a very little physical distortion. This ensures that the plastic green mixture with an inorganic binder added, after being hardened and then scanned by a high-power energy beam, can form a three-demensional ceramic workpiece 18 accurately.

The present invention uses inorganic binder 2b to bind ceramic powder 2a and to fill in the voids between powder particles and drives trapped air out therefrom, which eliminates the energy source for the powder particles to be dislocated after being heated. Since abruptly heated air expands and supplies the needed energy source for the powder particles to be dislocated, the present invention provides a method which can prevent such particle dislocation or clustering during the sintering process from occurring. The thickness of the thin ceramic layer is about the same as that of the thin green layer according to the present invention.

The absorption rate of the ceramic powder 2a for a $CO_2$ laser beam is about 90% or above, so it is relatively easy to reach the melting point of the material as soon as $CO_2$ laser beam is directed at the dehydrated thin green layer 15. Laser light with ultra short wavelength is also very absorbable to the ceramic powder 2a. Therefore, an ultra-violet laser or infrared laser such as a $CO_2$ laser beam is the choice for a high-power energy beam that can scan and subsequently sinter a thin green layer effectively. Furthermore, the relative movement between the high-power energy beam and the thin green layer can be of a relation about a moving thin green layer and a stationary energy beam or a moving energy beam and a stationary thin green layer, whereas the later typically has a better design. The movements of a high-power energy beam can be accomplished by using the mechanisms incorporated in a scanner or by using an X-Y table, whereas both technologies have become fairly mature nowadays and served a wide range of applications including laser engraving and marking. The scanning technology employs a computer with a numeric control program to control two reflection mirrors for directing the moving path and speed of a high-power energy beam. Consequently, the high-power energy beam can be accurately focused on a planar surface through a combination of focusing lens. On the other hand, the X-Y table technology employs a CNC (Computer Numeric Control) controller to control relative movements along two axes, i.e. the x-axis and the y-axis, which are perpendicular to each other. The high-power energy beam, after being reflected by a directing device such as a mirror to reach a focusing device, is focused on a working surface through a focusing lens. The scanning path of a laser beam can be either a vector type or a scan type. Using the vector type scanning path to process the workpiece requires less time than the scan type scanning path. Furthermore, conventional CAD/CAM software packages are already capable of generating vector type scanning path automatically. Such software packages typically comprises a 3-D solid modeling software engine that first accepts a 3-D representation of a workpiece as a drawing, then a CAM (Computer Aided Manufacturing) software engine slices the 3-D representation of the workpiece into a number of cross sections so as to generate a series of NC (Numerical Control) codes for each cross section. As a result, a complicated three-dimensional work process can now be converted into a simple two-dimensional work process, which solves the dead angle dilemma often encountered in a three-dimensional work process.

When a high-power energy beam is ready to scan a layer of the hardened green body, or when the energy beam enters a cross sectional outline of a workpiece, the energy beam is switched on, and when the energy beam exits the cross sectional outline of a workpiece, the energy beam is switched off. Accordingly, a computer with CNC programming controls a energy beam controller, which in turn controls the on and off switchings of the high-power energy beam.

The main input parameters for modulating the scanning process of a high-power energy beam are those of power output and scanning speed. The power output required by the process of the present invention depends on the efficiency to convert the energy of a high-power energy beam to heat energy; for example, with an output of 3 Watts or more, a $CO_2$ laser beam is readily capable of melting and sintering a Silica thin green layer. On the other hand, the settings of required scanning speed are closely related to the type of material being scanned. If the subject material has a relatively high melting point, or the layer being sintered is exceedingly thick, or the heat conducting rate of the material is relatively low, the scanning speed needs to be lowered accordingly.

d. Removing Un-sintered Green Portions

The ingredients of the plastic green mixture according to the present invention comprises ceramic powder 2a, inorganic binder 2b, and dissolving agent 2c mixing together and having a plastic property, wherein a very hard and thin layer of the green mixture is formed such that ceramic particles are interconnected to each other by the bonding action of an inorganic binder 2b. Since a laser-sintered, finished ceramic workpiece is typically buried among hardened green mixture portions, wherein this combination of finished ceramic workpiece and hardened green mixture portion is called in the present invention "green body block", it is necessary to remove the unsintered green mixture portions from the surroundings of the ceramic workpiece after sintering by a high-power energy beam.

Furthermore, the bonding mechanism for fabricating a sintered ceramic workpiece where ceramic particles are bonded to each other as they are being melted by a high-power energy beam is essentially different from the bonding mechanism induced by the inorganic binder 2b. Since the bonding mechanisms in the sintered ceramic workpiece and in the unsintered green portion are essentially different between their bonding structures on the molecular level and thus have different bonding energies, an external force or chemical solution can be applied to separate the two attached portions. A green body block with water glass as a binder can be soaked in a water bath after the ceramic workpiece with unsintered green portions attached is completed by the laser sintering process in order to separate the two attached workpiece portions. Although the unsintered green portion will not be separated from the sintered ceramic portion automatically, the unsintered green portion will be softened to certain extent for it to be removed easily by an external force such as a water jet. If the same green body block is soaked in a sodium hydroxide solution, the sintered ceramic portion will be separated from the unsintered green portion to reveal an intact ceramic workpiece automatically.

A green body block with $Al(H_2(PO_4))_3$ as a binder can also be removed by soaking in a water bath, but areas within 1 mm vicinity of the sintered ceramic portion have undergone an irreversible chemical reaction induced by high temperature such that this part of green portion can not be removed effectively by soaking in water. Instead, experiments have proved that soaking in a sodium hydroxide or potassium hydroxide solution can dissolve and subsequently remove the unsintered green portion completely.

Accordingly, experiments have shown that using water or an external force such as a water jet or chemicals such as a sodium hydroxide solution can remove the unsintered green portion. Thereby, the sintered ceramic workpiece, together with attached unsintered green portion, is placed inside a liquid container containing water, chemical solutions, or a water jet mechanism in order to remove the unsintered green portion from the ceramic workpiece.

APPARATUS EMBODIMENT

The method according to the present invention comprises four main steps. The mixing device 3 in Step (a) can be of a conventional type mixer as shown in FIG. 1A. In Step (d), a liquid container 23 containing a solution as shown in FIG. 1K is used to remove the un-sintered green portions, whereas the container is preferably made of anti-corrosion material that can resist the corrosion of a strong basic solution. Step (b) and Step (c) need to be executed repeatedly, and they are the main procedures of the method according to an embodiment of the present invention. The apparatus used to carry out the method, on the other hand, is a rapid prototyping machine 1 for ceramics. Although the machine can be operated in manual mode, it is preferred that all machines and equipment related to the present invention are automated by applying modern control technology such as the CAM (Computer Aided Manufacturing) technology, especially when the method according to the present invention requires many repeated steps to completely fabricate a 3-D ceramic workpiece.

Figure 2C:
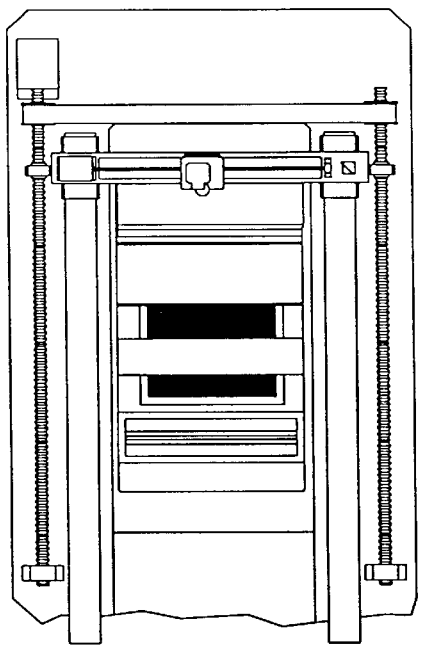
FIG. 2C is a top view of the drawing shown in FIG. 2A according to an apparatus embodiment of the present invention.
Figure 2B:
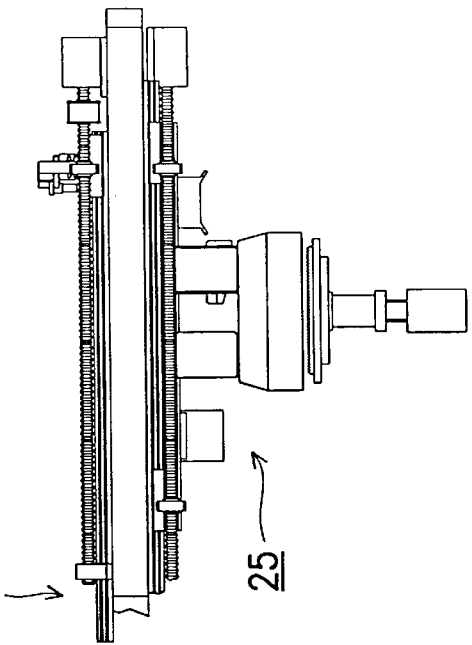
FIG. 2B is a front view of the drawing shown in FIG. 2A according to an apparatus embodiment of the present invention.
Figure 2D:
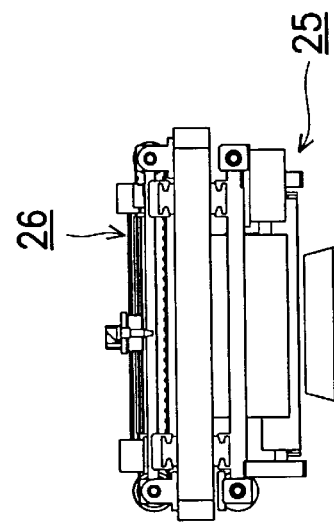
FIG. 2D is a side view of the drawing shown in FIG. 2A according to an apparatus embodiment of the present invention.
Figure 2E:
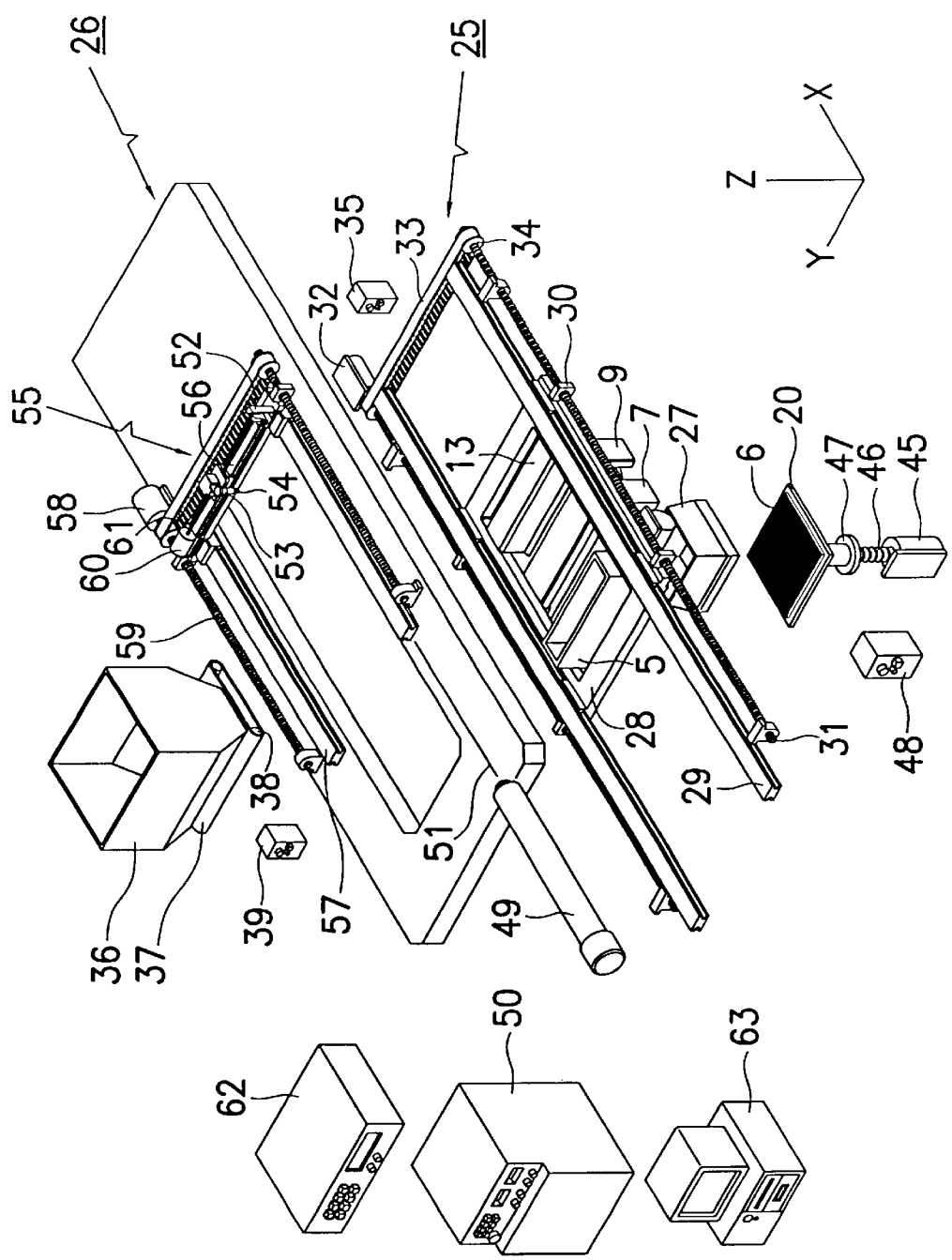
FIG. 2E shows an exploded view of the rapid prototyping machine for ceramics according to an apparatus embodiment of the present invention.
Figure 2F:
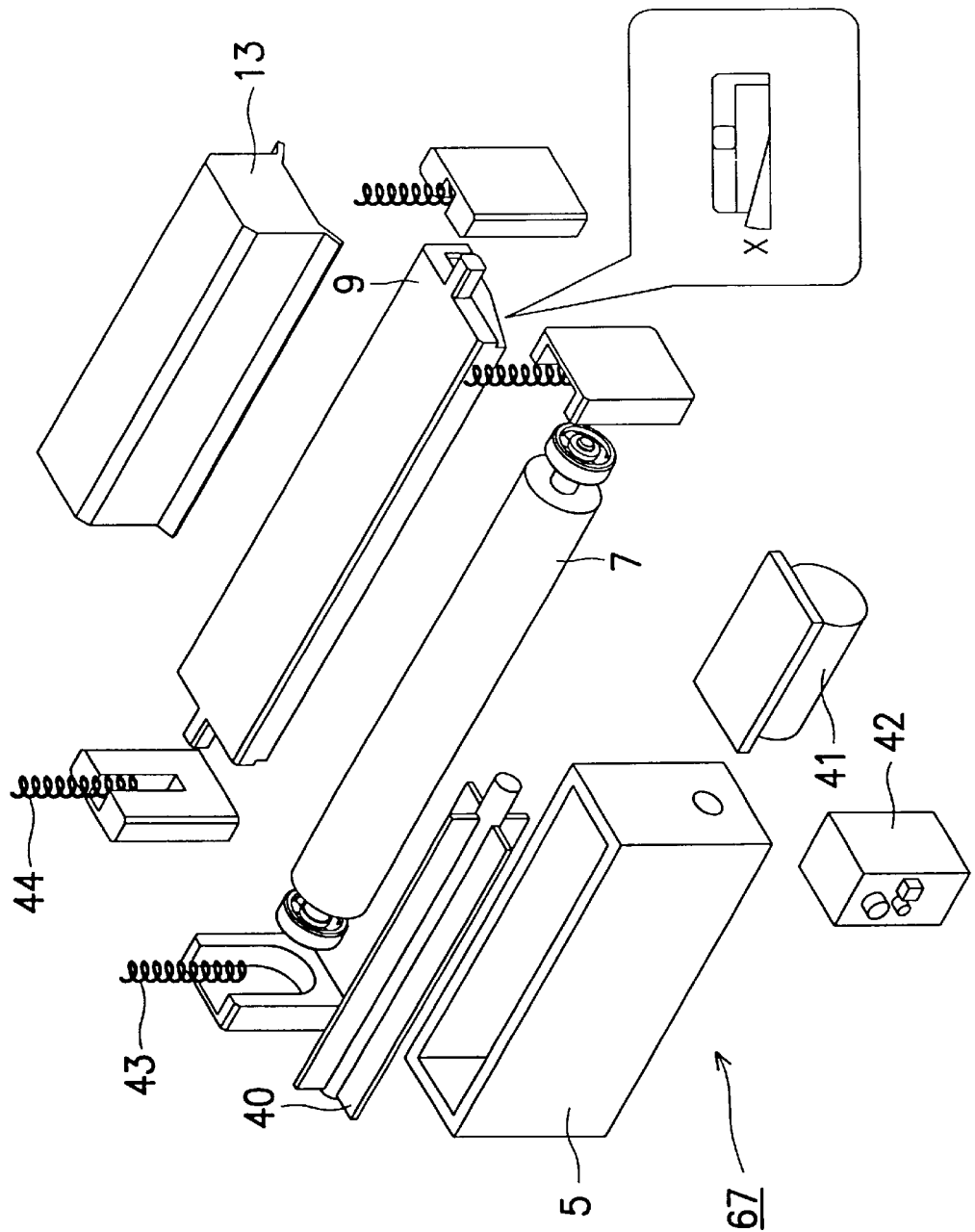
FIG. 2F shows an exploded view of a layer-forming device of the rapid prototyping machine for ceramics.
Figure 2G:
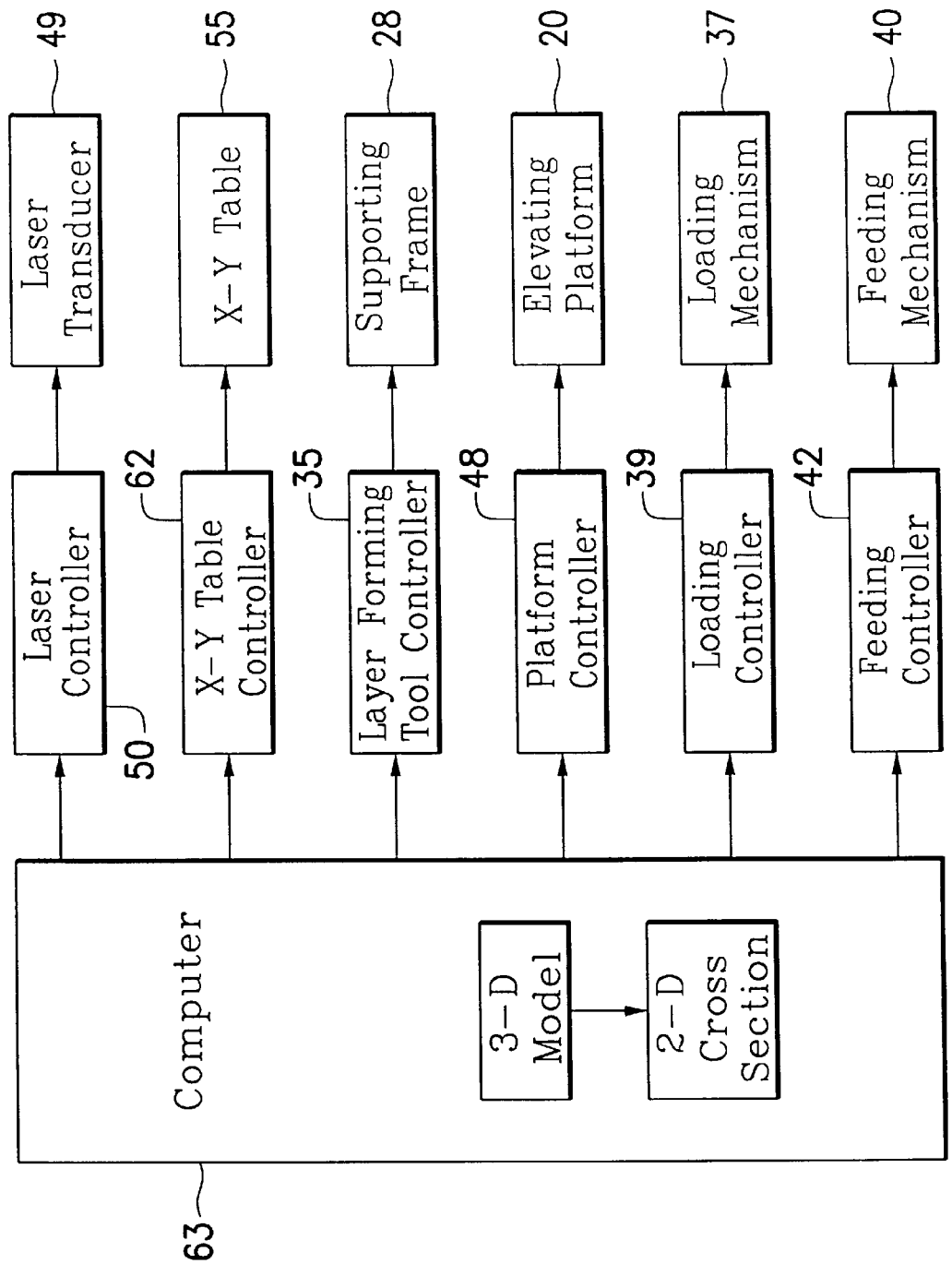
FIG. 2G is a block diagram depicting a system control structure of the rapid prototyping machine for ceramics according to an apparatus embodiment of the present invention.

FIG. 2A shows a perspective drawing of the rapid prototyping machine 1 for ceramics according to the present invention. Such machine comprises a layer forming device 25 and a laser sintering equipment 26. FIG. 2B shows a front view of the rapid prototyping machine 1, FIG. 2C shows a top view, and FIG. 2D shows a side view of the machine 1. With these three views, relative positions of the two comprising components are depicted, wherein the laser sintering equipment 26 is positioned on top of the layer forming device 25. FIG. 2E is an exploded view of the rapid prototyping machine 1 displaying the positions and shapes of various components. All of the important components of the machine 1 operate in accordance with the operating procedures shown in FIGS. 1B to 1H.

The layer forming device 25 further comprises a plurality of layer forming tools and a work platform with the layer forming tools comprising a feeding device 67, a roller 7, a squeegee board 9, and an infrared heating device 13, among other related mechanisms shown in FIG. 2F. The work platform, on the other hand, comprises a frame 27, a worktable 6, and an elevating platform 20, among other related mechanisms.

FIG. 2E shows a supporting frame 28 and a plurality of layer forming tools installed thereto. The supporting frame 28 is supported and balanced by two guide rails 29 and driven by a variable-speed mechanism comprising four first nuts 30 and two first screw rods 31. Such two first screw rods 31 are specifically driven by a motor 32 through a timing belt 33 and a belt gear 34. Further, the movement of the layer forming tools is controlled by a layer forming tool controller 35. The supporting frame 28 moves horizontally in the x-axis direction so when the supporting frame 28 reaches the end of the guide rails 29, the feeding container 5 can receive a feeding load of prepared plastic green mixture 4 from a storage tank 36 positioned directly above. The storage tank 36 stores a large amount of prepared plastic green mixture 4 for providing frequent loads to the feeding container 5, whereas the amount of a load is regulated by a loading mechanism 37, and the mechanism is further controlled by a loading motor 38 and a loading controller 39. Similarly, the feeding amount of the feeding device 67 is regulated by a feeding mechanism 40, and the rotational speed of the mechanism is controlled by a feeding motor 41 and a feeding controller 42 as shown by FIG. 2F. As the feeding mechanism 40, along with the feeding container 5 and others, moves from the end of the x-axis in the +X direction towards the −X direction and passing over the top of a worktable frame 27, loose plastic green mixture 8 is fed to the top surface of a worktable 6 and within the boundary of the frame 27. A roller 7 then strengthens the loose plastic green mixture 8 by pressing from the top to form a dense plastic green mixture 10, and a squeegee board 9 further spreads the dense plastic green mixture 10 into forming a thin layer. In addition, an infrared heating device 13 can be used to dry and harden the wet thin green layer 11. The feeding device 67, roller 7, and squeegee board 9 are all installed on the supporting frame 28 with their heights being adjustable in order to control the thickness of the thin green layer 11. As shown by FIG. 2F, utilizing a roller spring 43 and a squeegee board spring 44 to exert a force on the roller 7 and the squeegee board 9, respectively, the density of the thin green layer 11 can be properly adjusted through adjusting the reaction force of these springs, which affects the pressure exerted by the roller 7 and the squeegee board 9 to the thin green layer 11.

The worktable 6 is located directly under the frame 27 and above the elevating platform 20 such that its main function is to provide a flat surface that accepts and carries the weight of the feedings of the plastic green mixture. The surface top of the worktable 6 can be formed with several dimples to prevent the plastic green mixture from sliding around when it is being fed. Each time a sintered ceramic layer is completed, the worktable 6 is lowered a pre-determined distance downward to provide room for another thin green layer 11 to be formed. A step motor 45 drives the elevating platform 20 through a variable-speed mechanism comprising a coupled second screw rod 46 and a second nut 47, and a platform controller 48 controls each movement of the mechanism.

The laser sintering equipment 26 comprises a laser generating device, a guiding device, a focusing device, and a scanning device. The laser generating device further comprises a laser machine 49 and a laser controller 50, whereas the laser machine 49 converts electric energy to light energy. On the other hand, the laser controller 50 is commanded by the instructions of a NC (Numeric Code) program to switch on and off a laser beam 51 while regulating the power output and pulse rate of the laser beam 51 at the same time. The guiding device comprises two reflection mirrors 52 for re-directing the laser beam 51 in making a 90 degree angle turn. The focusing device is a laser focusing head 53 comprising a focusing lens 54, and its main function is to concentrate the laser beam 52 directed by the reflection mirrors 52 to increase the intensity of the beam for ceramic sintering. The scanning device is an X-Y table 55 which leads the laser beam 51 in moving along specified paths on an X-Y plane according to the commands of a NC program.

Furthermore, the laser focusing head 53 moves back and forth along a y-axis guide rail 56 of the X-Y table 55, and the y-axis guide rail 56 moves back and forth on a x-axis guide rail 57 of the X-Y table 55, thus the laser focusing head 53 translates its movements on an X-Y plane. The X-Y table 55 is driven by a x-axis servo motor 58 and a y-axis servo motor 60 through a coupled x-axis screw rod 59 and a coupled y-axis screw rod 61, respectively, with movements controlled by an X-Y table controller 62. The X-Y table controller 62 receives the commands of a NC program for controlling movements of the x-axis servo motor 58 and the y-axis servo motor 60.

FIG. 3 displays a block diagram depicting a system control structure of a rapid prototyping machine 1 for ceramics. Different movements of the rapid prototyping machine 1 for ceramics are controlled by the corresponding loading controller 39 of the storage tank 36, feeding controller 42 of the feeding container, layer forming tool controller 34, platform controller 48, and X-Y table controller 62, whereas the on and off switching, power output, and pulse rate of laser during the laser sintering process are all controlled and regulated by the laser controller 50. The operating sequence of combined movements are controlled and monitored by a process computer 63. A 3-D solid model of the ceramic workpiece to be formed can be created by an application software for 3-D drafting and solid modeling such as PRO-E, the model is then dissected into a number of two-dimensional cross sections, and final dimensional data of the 2-D cross sections are translated into NC code. After the NC codes are generated, fabrication of a ceramic workpiece can begin by inputting the NC code into the process computer 63 of the rapid prototyping machine 1 so that the process computer 63 can issue commands to various device controllers accordingly. The process computer 63 processes the inputted NC code data by making a queue list of cross sections to be processed first, sending commands to the platform controller 48 to lower the elevating platform 20, ordering the loading controller 39 of the storage tank 36 to unload to the feeding container 5. The supporting frame 28 then starts to move according to a pre-determined speed, the process is followed by the feeding of the plastic green mixture as the process computer 63 gives commands to the feeding controller 42 to place the mixture on a specified work surface. Finally, the roller 7, squeegee board 9, and infrared heater 13 are applied to the plastic green mixture in order to form a dehydrated thin green layer 15, and the laser controller 50 and the X-Y table controller are coordinated according to the NC commands to sinter the thin green layer locally with a laser beam. After a thin ceramic layer 19 is formed, next cross section of the 3-D ceramic workpiece is queued in by the process computer 63; the same aforementioned process is repeated until a final ceramic workpiece is completed.

PROCESS EMBODIMENT

The above has described technologies and equipment's related to each step of the ceramic fabricating process according to the present invention. For further understanding of the present invention, a more detailed description of the method embodiment for rapid ceramic workpiece fabrication according to the present invention is herein provided with the illustrations of FIG. 1A to FIG. 1L.

FIG. 1A, which is equivalent to Step (a), shows the step to prepare the plastic green mixture starting with composing material. The ceramic powder 2a, inorganic binder 2b, and dissolving agent 2c are all placed inside a mixing device 3 with suitable proportions to be mixed thoroughly, then the mixed composition materials, plastic green mixture 4, are unloaded to the feeding container 5.

FIG. 1B to FIG. 1F illustrate the steps for forming a thin layer of the plastic green mixture as described in Step (b). A feeding device feeds the plastic green mixture 4 onto the top surface of the worktable 6 as shown by FIG. 1B. A roller 7 then rolls over the loose green mixture 8 to press and harden the material to form a dense green mixture 10 as in FIG. 1C. Further, a squeegee board 9 flattens and spreads the dense green mixture 10 to form a thin green layer 11 as in FIG. 1D. An infrared heating device 13 then supplies heat energy to the thin green layer 13 to elevate its internal temperature as in FIG. 1E, which dehydrates the thin green layer 11 into forming a dehydrated thin green layer 15 as in FIG. 1F. The first thin layer of the plastic green mixture 4 should be thicker than others, or about 5 mm thick, and the dehydrated thin green layers 15 that follow should each be formed on top of the others with their thickness being as small as possible, or below 200 $\mu$m in thickness, so minute portions or small detail of a 3-D ceramic workpiece can be formed with great accuracy.

In addition, FIG. 1G shows the laser sintering step in which a ceramic workpiece is formed by scanning the thin green layer 11 one on top of another and causing binding between adjacent thin layers as melting takes place among ceramic particles scanned by the laser, which is also described in Step (c). The scanning path of the high-power energy beam 17 is generated automatically with the aid of a CAD/CAM computer software, and each scanning path is programmed by the process computer 63 based on the outline of a corresponding cross section of the 3-D ceramic workpiece 18 to be formed. Two-dimensional thin ceramic layer 19 of almost any shape can be produced by controlling the scanning path of the high-power energy beam 17. Whereas the high-power energy beam 17 is directed to the top planar surface of the thin green layer 11 from above at a perpendicular angle such that there is no blind spot on the surface unreachable by the high-power energy beam 17. Further, the worktable 6 is lowered with the elevating platform 20 each time a thin ceramic layer 19 is completed to accommodate the next thin green layer 11, whereas the lowering distance is about the thickness of each thin ceramic layer 19 as illustrated by FIG. 1H.

Repeating steps in FIG. 1B to FIG. 1H will produce a 3-D ceramic workpiece 18 with each cross section fabricated layer by layer according to the present invention. FIG. 1I shows the outline of a medium-stage workpiece 21, where several thin ceramic layers 19 of the workpiece are completed accordingly. FIG. 1J, on the other hand, shows a completed 3-D ceramic workpiece buried among green portions 22.

Finally in Step (d), The attached green portions 22 are removed from the 3-D ceramic workpiece 18 by soaking the ceramic workpiece 18, together with the worktable 6, in a separating device comprising a liquid container 23 with a dissolving agent 24 inside. The dissolving agent 24 inside the liquid container 23 weakens the bond between the ceramic workpiece 18 and the green portions 22 attached thereto, as depicted by FIG. 1K, thus a desired 3-D ceramic workpiece 18 is produced as depicted by FIG. 1L.

EXPERIMENT

Actual 3-D ceramic workpieces of aluminum oxide have been produced using the apparatus and process of the present invention. Aluminum oxide granules of 200 mesh size are mixed with 5% $Al(H_2(PO_4))_3$ and 6% of water with a conventional mixer to make plastic green mixture.

The plastic green mixture was sent to a semi-automatic rapid prototyping machine. Since the green mixture fed by the feeding device 67 is typically loosely formed, a roller 7 was applied to the loose mixture to form a dense green mixture 10, then a squeegee board 9 was used to flatten and spread the dense green mixture 10 in order to form a thin green layer 11. When the thin green layer 11 was being pre-heated for the purpose of expelling the water molecules from the moist thin green layer 11, a 1000-Watt infrared heating device of 6~12 $\mu$m wavelength was positioned above for a direct heating. The moist thin green layer 11 hardened in about one minute.

Next, a $CO_2$ laser beam with a 3-Watt power output and a scanning speed of 1280 mm/min was used to scan the dehydrated thin green layer 15 through the vector type scanning path of an X-Y table. After a 2-D thin ceramic layer 19 was formed, the elevating platform 20 was lowered a distance of 0.2 mm in order to fabricate another thin ceramic layer 19. The process of fabricating the thin ceramic layers 19 was continued with one layer on top of another until a 3-D ceramic workpiece was fully completed. The X-Y table accepted the commands of HPGL files, which are files supplied by a personal computer containing dimensional and other data of each cross section of the workpiece.

The HPGL files for each cross section of the workpiece, if all put together form a 3-D solid model, represent the actual workpiece, which is constructed with the powerful Pro/Engineer solid modeling computer software. The software generates relevant dimensional data that correspond to the parallel cross sections of a workpiece perpendicular to the z-axis. Each cross section was outputted with a name as a PLT format computer file and inputted to a controller of a rapid prototyping machine after simple coordinate transformations. The X-Y table then follows the commands of the controller to perform horizontal vector movements and on and off switching of a laser beam in order to scan the dehydrated thin green layer 15 in forming a plurality of interconnected thin ceramic layers 19.

The sintered ceramic workpiece 18 together with the attached green portions was placed in water, whereas the water dissolved the bond between the green portion and the ceramic workpiece and thus provided a simple separation between the two. However, the green portions within 1 mm vicinity of the sintered ceramic workpiece was not easily removed by soaking in water. A sodium hydroxide solution was used to dissolve and remove the remaining green portions completely. Since a sintered ceramic workpiece 18 holds the property of anti-corrosion, the green portions can be removed from the ceramic workpiece without harming it.

When examined under a microscope, the ceramic particles were found to have been melted and bounded to each other due to heat fusion, so it is assumed that the melting temperature of the ceramic workpiece according to the process of the present invention is about the same as that of the ceramic powder 2a itself. In actuality, the ceramic workpiece has been tested in a furnace to prove that it can withstand a temperature of 1000° C. without any apparent damage. Microscopic examination has also confirmed that the ceramic workpiece produced through the laser sintering process of the present invention has no cracks or other visible defects. In addition, the finished ceramic workpiece can be obtained with minimum deviation. Each thin layer of the ceramic workpiece had a thickness of about 0.2 mm. The overall density of the ceramic workpiece measured by an electronic densimeter was 3.558 $g/cm^3$. Accordingly, the ceramic workpiece produced through an implementation of the process and apparatus of the present invention does not need to be sintered in a furnace as in the conventional ceramic-making technique.

Furthermore, the method according to the present invention can produce ceramic workpiece of almost any complex configuration, which diversifies the application of the ceramic material in the field of 3-D prototyping and manufacturing of specific functional parts and tools. Such functional parts and tools include those that need to be heat-resistant, corrosion-resistant, electricity insulating, or even anti-friction. The ceramic material itself has many intrinsic characteristics such that the material is typically brittle with a high hardness number while being electrically insulating. In particular, ceramic workpieces are difficult to be machined and welded properly. Therefore, most of the high-precision ceramic parts used in industry are manufactured through the method of powder metallurgy where a mold for producing the green parts of each workpiece has to be made first. The present invention therefore can lower the overall cost of ceramic workpiece fabrication by not using a mold throughout the process; it is especially practical when only a limited number of the same workpiece need to be produced.

Figure 4A:
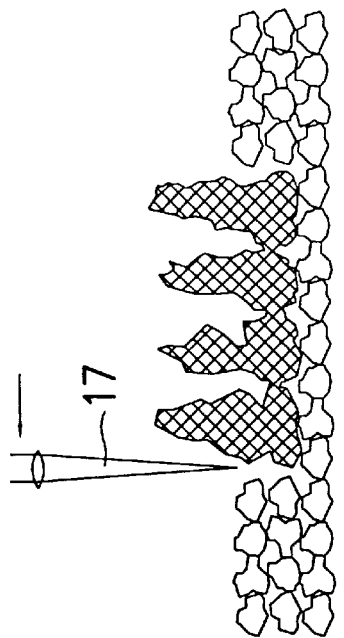
FIG. 4A to FIG. 4D show the different sintered results between the SLS method and the method according to the present invention.
Figure 4B:
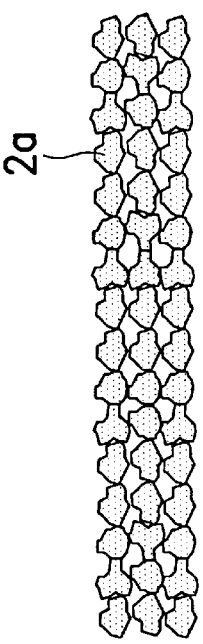
Figure 4C:
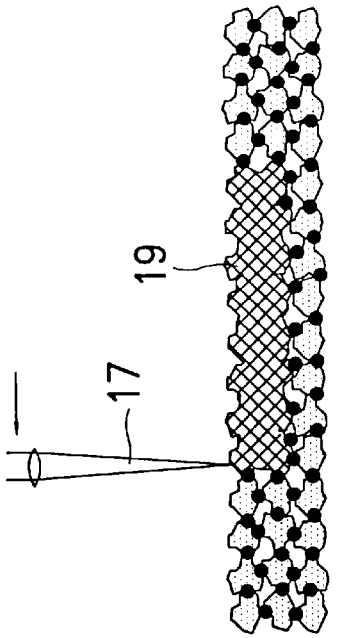
Figure 4D:
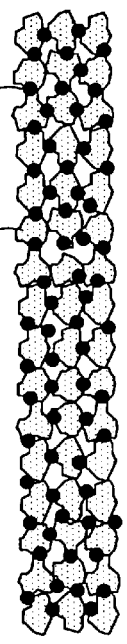

Referring to FIG. 4A to FIG. 4D, the main difference between the SLS method and the present invention is that the SLS method applies a directed high-power energy beam 17 to the ceramic powder 2a in its original powder form as shown by FIG. 4A. FIG. 4B shows that sintering of these loosely scattered ceramic powder 2a could easily cause dislocation of the ceramic powder 2a due to clustering of the powder particles, or balling effect. On the other hand, FIGS. 4C and 4D show similar sintering steps as to FIGS. 4A and 4B according to an embodiment of the present invention, respectively, but with a significantly improved result. FIG. 4C shows that particles of the same ceramic powder 2a are bounded to each other by the adhesive property of an added inorganic binder 2b. Then a high-power energy beam 17 is directed to scan the adhesive-bounded green layer, whereas the particles of the plastic green layer can not be easily shifted during the sintering process. In comparison, the SLS method is not suitable for sintering a ceramic workpiece directly. If the SLS method is applied on a 0.2 mm thick layer of the ceramic powder 2a in an attempt to sinter it directly with a laser, various lumps of about 1 to 2 mm in height would occur since particles of the ceramic powder 2a are being shifted or dislocated during the process; the result would have made the forming of a 0.2 mm thick ceramic layer simply impossible.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

what is claimed is:

1. A method for rapid forming of a ceramic work piece, comprising the steps of:
   a. mixing an inorganic binder, a dissolving agent, and ceramic powder together to form a plastic green mixture;
   b. forming a thin green layer on a specified surface with the plastic green mixture;
   c. hardening the thin green layer due to adhesive bonding among ceramic particles by the inorganic binder;
   d. scanning the hardened thin green layer with a directed high-power energy beam along a pre-determined path in order to sinter and bond ceramic molecules locally by heat fusion and produce a two-dimensional thin cross section of the ceramic workpiece;
   e. repeating Steps (b), (c), and (d) until a three dimensional ceramic workpiece is fabricated based on a pre-determined number of thin ceramic layers that are bonded together by the high-power energy beam of Step (d); and
   f. removing a green portion of the ceramic part that is not scanned by the high-power energy beam and thus producing a ceramic workpiece.

2. The method as claimed in claim 1, wherein the thin green layer is preheated before being scanned by the high-power energy beam so that the hardening rate of the thin green layer can be accelerated.

3. The method as claimed in claim 2, wherein the thin green layer is preheated by light or microwave energy.

4. The method as claimed in claim 2, wherein the thin green layer is preheated by infrared energy.

5. The method as claimed in claim 1, wherein the ceramic powder comprises either a single ceramic ingredient or a mixture of two or more ingredients.

6. The method as claimed in claim 5, wherein the single ceramic ingredient comprises either carbides, nitrides, aluminum oxide, silicon oxide, zirconia oxide, or other oxides, all of which are in powder form.

7. The method as claimed in claim 1, wherein the inorganic binder comprises of either water glass, clay, or aluminum dyhydrogen phosphate $(Al(H_2(PO_4))_3)$.

8. The method as claimed in claim 1, wherein the dissolving agent is water.

9. The method as claimed in claim 1, wherein the thin green layer is formed on a specified surface by a press-forming roller.

10. The method as claimed in claim 1, wherein the thin green layer is formed on a specified surface by a squeegee board.

11. The method as claimed in claim 1, wherein the thin green layer is formed on a specified surface by a press-forming roller followed by a squeegee board.

12. The method as claimed in claim 1, wherein the high-power energy beam is a laser beam.

13. The method as claimed in claim 1, wherein the high-power energy beam is a $CO_2$ laser beam.

14. The method as claimed in claim 1, wherein the high-power energy beam is an ultra-violet laser beam.

15. The method as claimed in claim 1, wherein the green portion of the ceramic part that is not scanned by the high-power energy beam is removed by soaking in a sodium hydroxide solution.

16. The method as claimed in claim 1, wherein the green portion of the ceramic part that is not scanned by the high-power energy beam is removed by soaking in water.

17. The method as claimed in claim 1, wherein the green portion of the ceramic part that is not scanned by the high-power energy beam is removed by soaking in a potassium hydroxide solution.

* * * * *